United States Patent
Tranninger et al.

(10) Patent No.: US 9,290,649 B2
(45) Date of Patent: Mar. 22, 2016

(54) MOUDLING COMPOSITION

(71) Applicant: Borealis AG, Vienna (AT)

(72) Inventors: Michael Tranninger, Pucking (AT); Martina Sandholzer, Linz (AT); Klaus Bernreitner, Linz (AT); Markus Gahleitner, Neuhofen/Krems (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/345,334

(22) PCT Filed: Sep. 18, 2012

(86) PCT No.: PCT/EP2012/068299
§ 371 (c)(1),
(2) Date: Mar. 17, 2014

(87) PCT Pub. No.: WO2013/041508
PCT Pub. Date: Mar. 28, 2013

(65) Prior Publication Data
US 2014/0357771 A1  Dec. 4, 2014

(30) Foreign Application Priority Data

Sep. 21, 2011  (EP) .................................... 11182162

(51) Int. Cl.
| | | |
|---|---|---|
| *C08L 23/14* | (2006.01) | |
| *C08K 3/04* | (2006.01) | |
| *C08K 5/20* | (2006.01) | |
| *C08K 7/14* | (2006.01) | |
| *C08L 23/16* | (2006.01) | |
| *C08L 51/06* | (2006.01) | |
| *C08K 3/40* | (2006.01) | |

(52) U.S. Cl.
CPC . *C08L 23/14* (2013.01); *C08K 3/04* (2013.01); *C08K 3/40* (2013.01); *C08K 5/20* (2013.01); *C08K 7/14* (2013.01); *C08L 23/16* (2013.01); *C08L 51/06* (2013.01); *C08L 2205/02* (2013.01); *C08L 2205/025* (2013.01); *C08L 2205/08* (2013.01); *C08L 2207/02* (2013.01)

(58) Field of Classification Search
CPC ...................................................... C08L 23/14
See application file for complete search history.

(56) References Cited

U.S. PATENT DOCUMENTS 8,519,044 B2 * 8/2013 Stockreiter et al. ........... 524/494

FOREIGN PATENT DOCUMENTS

| CN | 101868498 A | 10/2010 | |
|---|---|---|---|
| CN | 101896518 A | 11/2010 | |
| CN | 101896522 A | 11/2010 | |
| EP | 2 062 963 A1 * | 5/2009 | ............ C08L 23/10 |
| EP | 2062936 A1 | 5/2009 | |
| EP | 2308923 A1 | 4/2011 | |
| WO | 2007025663 A1 | 3/2007 | |

OTHER PUBLICATIONS

Koch, Thomas, et al., "Evaluation of Scratch Resistance in Multiphase PP Blens", Polymer Testing 26 (2007) 927-936.
Kromidas, Starvos, "Validierung in der Analytik", Wiley-VCH 1999 ISBN 3-527-28748-5.
First Chinese Office Action dated May 6, 2015.

* cited by examiner

*Primary Examiner* — Robert Harlan
(74) *Attorney, Agent, or Firm* — Tarolli, Sundheim, Covell & Tummino LLP

(57) ABSTRACT

Polyolefin composition comprising a heterophasic propylene copolymer and glass material, wherein said heterophasic propylene copolymer has • a xylene cold soluble fraction in the range of 25 to 50 wt.-%, and • a comonomer content in the range of 10.0 to 15.0 wt.-%, wherein further the xylene cold soluble fraction of the heterophasic propylene copolymer has a comonomer content in the range of 20 to 30 wt.-% and the polyolefin composition has a melt flow rate $MFR_2$ (230° C.) of 2.0 to 15.0 g/10 min.

15 Claims, No Drawings

MOUDLING COMPOSITION

The present invention is directed to a new polyolefin composition for use in injection moulding, to injection moulded articles as well as to the preparation of the new polyolefin composition.

Polypropylene is a material used in a wide variety of technical fields and reinforced polypropylenes have in particular gained relevance in fields previously exclusively relying on non-polymeric materials, in particular metals. Such materials enable a tailoring of the properties of the composition by selecting the type of polypropylene and the amount and type of reinforcing agent used. Reinforced polypropylene for instance has good mechanical properties however attended by an unpleasant hardness of the material, which is detrimental for automotive interior parts like dashboards, door claddings, trims etc. For this parts it is often tried to mimic a leather- or fabric-like surface and touch in order to give occupants a high-quality impression of the car. As a result materials used should provide a low surface gloss level and good haptics. Additionally to maintain the high-quality perception of the parts till the end of the car's lifetime the polymer should provide a high resistance to scratches e.g. from keys, fingernails, rings etc.

In WO 2007/025663 a composition has been provided which combines good mechanical properties with improved soft touch feeling. However the improvement in haptics has been paid with loss in stiffness and gloss. Further the resistance to scratches are not for all provided solutions satisfactorily. More detrimental the provided solutions with the best stiffness suffer from low scratch resistance.

Thus the object of the present invention is to provide a composition which on the one hand guarantees good mechanical properties and on the other hand successfully mimics a leather- or fabric-like surface.

The finding of the present invention is to provide a polyolefin composition comprising glass material and a heterophasic propylene copolymer with a matrix being a random propylene copolymer in which an elastomeric propylene copolymer is dispersed, the heterophasic propylene copolymer is further featured by a moderate comonomer content of the xylene cold soluble fraction but a rather high overall comonomer content.

Accordingly the present invention is directed to a polyolefin composition comprising
(a) at least 50 wt.-% based on the polyolefin composition of a heterophasic propylene copolymer (RAHECO) comprising a matrix (M) being a random propylene copolymer (R-PP) and an elastomeric propylene copolymer (E) dispersed in said matrix (M),
  wherein said heterophasic propylene copolymer (RAHECO) has
  (a1) a xylene cold soluble fraction (XCS) determined according ISO 16152 (25° C.) in the range of 25 to 50 wt.-% based on the heterophasic propylene copolymer (RAHECO), and
  (a2) a comonomer content in the range of 10.0 to 15.0 wt.-% based on the heterophasic propylene copolymer (RAHECO),
  wherein further the xylene cold soluble fraction (XCS) of the heterophasic propylene copolymer (RAHECO) has
  (a3) a comonomer content in the range of 20 to 30 wt.-% based on the xylene cold soluble fraction (XCS) of the heterophasic propylene copolymer (RAHECO), and
(b) at least 5 wt.-% based on the polyolefin composition of a filler (F) being a glass material (GM), wherein the polyolefin composition has a melt flow rate $MFR_2$ (230° C.) measured according to ISO 1133 of 2.0 to 15.0 g/10 min.

It has surprisingly been found that such a composition combines good mechanical properties with low gloss, good scratch resistance and soft touch feeling.

In the following the invention is defined in more detail.

The instant polyolefin composition should have a rather high melt flow rate to reduce the pressure during the injection molding process. Accordingly it is preferred that the polyolefin composition has a melt flow rate $MFR_2$ (230° C.) measured according to ISO 1133 of at least 2.0 g/10 min. Preferably the polyolefin composition has a melt flow rate $MFR_2$ (230° C.) in the range of 2.0 to 15.0 g/10 min, more preferably in the range of 2.5 to 13.0 g/10 min, still more preferably in the range of 3.0 to 12.0 g/10 min.

Additionally the inventive composition should be lightweight. Accordingly it is preferred that the polyolefin composition has a density measured according to ISO 1183-1 of not more than 1100 $kg/m^3$, more preferably in the range of 980 to 1100 $kg/m^3$, still more preferably in the range of 1000 to 1050 $kg/m^3$, like in the range of 1010 to 1040 $kg/m^3$.

As mentioned above the instant polyolefin composition is rather stiff. Accordingly the polyolefin composition shall have a tensile modulus measured according to ISO 527-2 of at least 1,000 MPa, more preferably of at least 1,500 MPa, like at least 1,600 MPa. On the other hand if the tensile modulus is too high a soft touch feeling cannot be ensured. Thus it is preferred that the instant polyolefin composition has a tensile modulus in the range of 1,000 to 2,300 MPa, more preferably in the range of 1,500 to 2,200 MPa, like in the range of 1,550 to 2,100 MPa.

Further the gloss of the polyolefin composition according to this invention shall be rather low. Thus it is preferred that the polyolefin composition has a gloss at an angle of 60° of below 2.5%, more preferably in the range of 1.5 to 2.5%, yet more preferably in the range of 1.7 to 2.3%.

In a further preferred embodiment the polyolefin composition has a scratch resistance as defined by the absolute reflectance difference, |ΔL|, of below 1.5, more preferably in the range of 0.0 to 1.0, yet more preferably in the range of 0.0 to 0.8, like 0.0 to 0.5.

Preferably the instant polyolefin composition does not comprise a further plastomer to the one being dispersed in the matrix (M) of the heterophasic propylene copolymer (RAHECO). A plastomer according to this invention are elastomers including LDPE, LLDPE and HDPE. Even more preferred the polyolefin composition does not comprise a polymer different to the heterophasic propylene copolymer (RAHECO) in an amount exceeding 4 wt.-%, more preferably exceeding 3%, based on the polymers present in the polyolefin composition.

The polyolefin composition according to this invention must comprise the heterophasic propylene copolymer (RAHECO) and the filler (F). Preferably the polyolefin composition comprises in addition at least one of the components selected from the group of compatibilizer (C), carbon black (CB), and slip agent (SA). Even more preferred the composition comprises all three additional components. Thus it is preferred that the polyolefin composition comprises
(a) at least 50 wt.-%, more preferably 50 to 90 wt.-%, yet more preferably 60 to 80 wt.-%, of the heterophasic propylene copolymer (RAHECO),
(b) at least 5 wt.-%, more preferably 5 to 40 wt.-%, yet more preferably 10 to 30 wt.-%, of the filler (F), (c) optionally at least 0.5 wt.-%, more preferably 0.5 to 4 wt.-%, yet more preferably 0.5 to 2.5 wt.-%, of the compatibilizer (C),
(d) optionally at least 0.5 wt.-%, more preferably 0.5 to 5 wt.-%, yet more preferably 1 to 4 wt.-%, of the carbon black (CB), and
(e) optionally at least 0.01 wt.-%, more preferably 0.01 to 2 wt.-%, yet more preferably 0.1 to 1 wt.-%, of the slip agent (SA), based on the total polyolefin composition.

The polyolefin composition of the present invention can be prepared by any suitable method known in the art, such as by blending the heterophasic propylene copolymer (RAHECO), the filler (F), and the additional components, if present, like the compatibilizer (C), the carbon black (CB), and the slip agent (SA) either directly, e.g., in an extruder, such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or a twin screw extruder may be used.

In the following the individual components will be described in more detail.

Heterophasic Propylene Copolymer (RAHECO)

The heterophasic propylene copolymer (RAHECO) according to this invention comprises a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO), said inclusions are for instance visible by high resolution microscopy, like electron microscopy or scanning force microscopy.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives but no other polymer in an amount exceeding 5 wt.-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

The heterophasic propylene copolymer (RAHECO) according to this invention is featured by a moderate melt flow rate. Accordingly, the heterophasic propylene copolymer (HECO) has a melt flow rate $MFR_2$ (230° C.) in the range of 2.0 to 15.0 g/10 min, preferably in the range of 2.5 to 13.0 g/10 min, more preferably in the range of 3.0 to 12.0 g/10 min.

Preferably it is desired that the heterophasic propylene copolymer (RAHECO) is thermo-mechanically stable. Accordingly it is appreciated that the heterophasic propylene copolymer (RAHECO) has a melting temperature of at least 130° C., more preferably in the range of 130 to 150° C., still more preferably in the range of 130 to 148° C.

Typically the heterophasic propylene copolymer (RAHECO) has a rather low crystallization temperature, i.e. of not more than 110° C., more preferably in the range of 85 to 110° C., still more preferably in the range of 90 to 108° C.

The heterophasic propylene copolymer (RAHECO) comprises apart from propylene also comonomers. Preferably the heterophasic propylene copolymer (RAHECO) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins.

Thus the propylene copolymers according to this invention, i.e. the heterophasic propylene copolymer (RAHECO), the random propylene copolymers (R-PP), the first propylene copolymer fraction (R-PP1), the second propylene copolymer fraction (R-PP2), and the elastomeric propylene copolymer (E), comprise monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymers according to this invention comprise, especially consist of, monomers copolymerizable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only. Still more preferably the random propylene copolymer (R-PP) as well as the elastomeric propylene copolymer (E) contain the same comonomers, like ethylene.

Accordingly, the elastomeric propylene copolymer (E) is preferably an ethylene propylene rubber (EPR), whereas the random propylene copolymer (R-PP) is a random ethylene propylene copolymer (R-PP).

Additionally it is appreciated that the heterophasic propylene copolymer (RAHECO) preferably has a rather high total comonomer content which contributes to the softness of the material. Thus it is required that the comonomer content of the heterophasic propylene copolymer (RAHECO) is at least 10 wt.-%, preferably in the range of 10.0 to 15.0 wt.-%, more preferably in the range of 10.0 to 14.0 wt.-%, yet more preferably in the range of 10.5 to 13.5 wt.-%, based on the heterophasic propylene copolymer (RAHECO).

The xylene cold soluble (XCS) fraction measured according to according ISO 16152 (25° C.) of the heterophasic propylene copolymer (RAHECO) is at least 25 wt.-%, preferably in the range of 25 to 50 wt.-%, more preferably in the range of 30 to 45 wt.-%, still more preferably in the range of 35 to 42 wt.-%, based on the heterophasic propylene copolymer (RAHECO).

Further it is appreciated that the xylene cold soluble (XCS) fraction of the heterophasic propylene copolymer (RAHECO) is specified by its intrinsic viscosity. A low intrinsic viscosity (IV) values reflect a low weight average molecular weight. For the present invention it is required that the xylene cold soluble fraction (XCS) of the heterophasic propylene copolymer (RAHECO) has an intrinsic viscosity (IV) measured according to ISO 1628/1 (at 135° C. in decalin) of below 2.0 dl/g, more preferably of in the range of 0.8 to below 2.0 dl/g, still more preferably in the range of 1.0 to 1.9 dl/g, still yet more preferably like in the range of 1.0 to below 1.8 dl/g, like in the range of 1.0 to below 1.7 dl/g.

Additionally it is preferred that the comonomer content, i.e. ethylene content, of the xylene cold soluble (XCS) fraction of the heterophasic propylene copolymer (RAHECO) is not more than 30.0 wt.-%, more preferably in the range of 18.0 to 30.0 wt.-%, still more preferably in the range of 20.0 to 30.0 wt.-%, yet more preferably in the range of 20.0 to 27.0 wt.-%, based on the xylene cold soluble (XCS) fraction of the heterophasic propylene copolymer (RAHECO). The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

As mentioned above the heterophasic propylene copolymer (RAHECO) is featured by a rather high comonomer content. Accordingly the comonomer content of the random propylene copolymer (R-PP) is at least 6.0 wt.-%, more preferably in the range of 6.0 to 9.0 wt.-%, yet more preferably in the range of 6.5 to 8.0 wt.-%, still more preferably in the range of 6.8 to 7.8 wt.-%, based on the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The random propylene copolymer (R-PP) preferably comprises at least two polymer fractions, like two or three polymer fraction, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

In one preferred embodiment the first propylene copolymer faction (R-PP1) has a comonomer content in the range of 1.5 to 6.0 wt.-%, preferably in the range of 2.0 to 6.0 wt.-%, still more preferably in the range of 2.0 to 5.0, like in the range of 2.0 to 4.5 wt.-%, based on the first propylene copolymer faction (R-PP1).

The second propylene copolymer fraction (R-PP2) has preferably a comonomer content in the range of 8.0 to 12 wt.-%, more preferably in the range of 9.0 to 11.0 wt.-%, like in the range of 9.5 to 10.8 wt.-%, based on the second propylene copolymer fraction (R-PP2).

It is additionally appreciated that the following in equation (I), preferably in equation (Ia), is fulfilled:

$$[R\text{-}PP]-[R\text{-}PP1]\geq 2.5 \qquad (I)$$

$$[R\text{-}PP]-[R\text{-}PP1]\geq 2.8 \qquad (Ia)$$

wherein

[R-PP] the comonomer content [wt.-%] of the random propylene copolymer (R-PP) based on the random propylene copolymer (R-PP), and

[R-PP1] the comonomer content [wt.-%] of the first propylene copolymer fraction (R-PP1) based on the first propylene copolymer faction (R-PP1), Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

A further component of the heterophasic propylene copolymer (RAHECO) is the elastomeric propylene copolymer (E) dispersed in the matrix (M). Concerning the comonomers used in the elastomeric propylene copolymer (E) it is referred to the information provided for the heterophasic propylene copolymer (RAHECO). Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only.

The comonomer content of the elastomeric propylene copolymer (E) preferably is in the range of 28.0 to 40.0 wt.-%, more preferably in the range of 30.0 to 38.0 wt.-%, like in the range of 30.0 to 36.0 wt.-%, based on the elastomeric propylene copolymer (E).

Further, the weight ratio between the first propylene copolymer fraction (R-PP1) and second propylene copolymer fraction (R-PP2) preferably is 30:70 to 70:30, more preferably 35:65 to 65:35, still more preferably 40:60 to 60:40.

On the other hand the weight ratio between the random propylene copolymer (R-PP) and the elastomeric propylene copolymer (E) preferably is 90:10 to 70:30, more preferably 85:15 to 75:25.

As described in detail below the heterophasic propylene copolymer (RAHECO) is preferably obtained by visbreaking a heterophasic propylene copolymer (Pre-RAHECO). Accordingly in the following the heterophasic propylene copolymer (Pre-RAHECO) is described in more detail.

The heterophasic propylene copolymer (Pre-RAHECO) comprises a matrix (Pre-M) being a random propylene copolymer (Pre-R-PP) and an elastomeric propylene copolymer (Pre-E) dispersed in said matrix (Pre-M). Preferably the random propylene copolymer (Pre-R-PP) comprises at least two polymer fractions, like two or three polymer fraction, all of them are propylene copolymers. Even more preferred the random propylene copolymer (Pre-R-PP) comprises, preferably consists of, a first propylene copolymer fraction (Pre-R-PP1) and a second propylene copolymer fraction (Pre-R-PP2).

Visbreaking does not alter the amount or type of comonomer. Accordingly with regard to the amounts of comonomer in the heterophasic propylene copolymer (Pre-RAHECO) and its individual fractions it is referred to the heterophasic propylene copolymer (RAHECO) and its fractions, respectively. The same applies for the comonomer types used in these fractions.

Further the heterophasic propylene copolymer (Pre-RAHECO) preferably has a melt flow rate $MFR_2$ (230° C.) measured according to ISO 1133 in the range of 0.3 to 2.5 g/10 min, more preferably in the range of 0.6 to 2.0 g/10 min. The melt flow rate $MFR_2$ (230° C.) of the heterophasic propylene copolymer (Pre-RAHECO) is lower compared to the melt flow rate $MFR_2$ (230° C.) of the (visbroken) heterophasic propylene copolymer (RAHECO). Accordingly the difference between the melt flow rate $MFR_2$ (230° C.) of the (visbroken) heterophasic propylene copolymer (RAHECO) and the heterophasic propylene copolymer (Pre-RAHECO) [$MFR_2$ (RAHECO)–$MFR_2$ (Pre-RAHECO)] is at least 0.5 g/10 min, more preferably at least 1.0 g/10 min, yet more preferably at least 5.0 g/10 min, still more preferably in the range of 1.0 to 15.3 g/10 min, like in the range of 2.0 to 10.0 g/10 min.

The xylene cold soluble (XCS) fraction measured according to according ISO 16152 (25° C.) of the heterophasic propylene copolymer (Pre-RAHECO) is at least 25 wt.-%, preferably in the range of 25 to 50 wt.-%, more preferably in the range of 30 to 48 wt.-%, still more preferably in the range of 38 to 45, based on the heterophasic propylene copolymer (Pre-RAHECO).

The xylene cold soluble fraction (XCS) of the heterophasic propylene copolymer (Pre-RAHECO) preferably has an intrinsic viscosity (IV) measured according to ISO 1628/1 (at 135° C. in decaline) of below 3.0 dl/g, more preferably of in the range of 1.4 to below 2.5 dl/g, still more preferably in the range of 1.5 to 2.3 dl/g.

As indicated above the random propylene copolymer (Pre-R-PP) comprises at least two, more preferably comprises two, yet more preferably consists of two, propylene copolymer fractions (Pre-R-PP1) and (Pre-R-PP2), the two propylene copolymer fractions (Pre-R-PP1) and (Pre-R-PP2) differ from each other by the comonomer content. Accordingly it is preferred that the first propylene copolymer fraction (Pre-R-PP1) is the comonomer lean fraction whereas the second propylene copolymer fraction (Pre-R-PP2) is the comonomer rich fraction. Concerning the preferred comonomer content in each fraction it is referred to the information provided for the first propylene copolymer fraction (R-PP1) and the second propylene copolymer fraction (R-PP2), respectively. The same applies to the weight ratio between the first propylene copolymer fraction (Pre-R-PP1) and the second propylene copolymer fraction (Pre-R-PP2). Also with regard to this requirement it is referred to the first propylene copolymer fraction (R-PP1) and the second propylene copolymer fraction (R-PP2), respectively.

Further it is preferred that the first propylene copolymer fraction (Pre-R-PP1) and the second propylene copolymer fraction (Pre-R-PP2) have nearby the same melt flow rate. Accordingly it is preferred that difference between the melt flow rate of the random propylene copolymer (Pre-R-PP) and the first propylene copolymer fraction (Pre-R-PP1) [MFR (Pre-R-PP)–MFR(Pre-R-PP1)] is below +/−1.5 g/10 min, more preferably +/−1.0 g/10 min, yet more preferably +/−0.5 g/10 min. Thus in one embodiment the first propylene copolymer fraction (Pre-R-PP1) and the second propylene copolymer fraction (Pre-R-PP2) have a melt flow rate $MFR_2$ (230° C.) in the range of 0.3 to 3.0 g/10 min, more preferably in the range of 0.6 to 2.5 g/10 min.

As mentioned above the first propylene copolymer fraction (Pre-R-PP1) is the comonomer lean fraction whereas the second propylene copolymer fraction (Pre-R-PP2) is the comonomer rich fraction. A higher comonomer content increases also the xylene soluble content. Thus the first propylene copolymer fraction (Pre-R-PP1) preferably has higher xylene cold soluble (XCS) content than the second propylene copolymer fraction (Pre-R-PP2). Consequently it is preferred that the difference between the xylene cold soluble content (XCS) (in weight percentage) of the random propylene copolymer (Pre-R-PP) and the first propylene copolymer fraction (Pre-R-PP1) [XCS (Pre-R-PP)–XCS(Pre-R-PP1)] is at least 14 wt.-%, more preferably in the range of 14 to 25 wt.-%, yet more preferably in the range of 15 to 23 wt.-%. Thus in one embodiment the first propylene copolymer fraction (Pre-R-PP1) has a xylene cold soluble content (XCS) in the range 2 to 12 wt.-%, more preferably in the range of 3 to 10 wt.-% based on the first propylene copolymer fraction (Pre-R-PP1) and/or the second propylene copolymer fraction (Pre-R-PP2) has a xylene cold soluble content (XCS) in the range of 25 to 60 wt.-%, more preferably in the range of 30 to 50 wt.-% based on the second propylene copolymer fraction (Pre-R-PP2).

A further component of the heterophasic propylene copolymer (Pre-RAHECO) is the elastomeric propylene copolymer (Pre-E) dispersed in the matrix (Pre-M), i.e. in the random propylene copolymer (Pre-R-PP). Concerning the comonomers used in the elastomeric propylene copolymer (Pre-E) it is referred to the information provided for the heterophasic propylene copolymer (RAHECO) and especially for the elastomeric propylene copolymer (E). Accordingly any information provided regarding the comonomer content and comonomer type of the elastomeric propylene copolymer (E) can be used one-to-one for the elastomeric propylene copolymer (Pre-E).

Further, the weight ratio between the first propylene copolymer fraction (Pre-R-PP1) and second propylene copolymer fraction (Pre-R-PP2) preferably is 30:70 to 70:30, more preferably 35:65 to 65:35, still more preferably 40:60 to 60:40.

On the other hand the weight ratio between the random propylene copolymer (Pre-R-PP) and the elastomeric propylene copolymer (Pre-E) preferably is 90:10 to 70:30, more preferably 85:15 to 75:25.

The heterophasic propylene copolymer (RAHECO) is preferably obtained as follows: Preferably first the heterophasic propylene copolymer (Pre-RAHECO) is produced and subsequently said copolymer is degraded to the heterophasic propylene copolymer (RAHECO). Accordingly the preparation of the heterophasic propylene copolymer (RAHECO) comprises the steps of (a) polymerizing in a first reactor propylene and ethylene and/or $C_4$ to $C_{12}$ α-olefin obtaining thereby a first propylene copolymer fraction (Pre-PP1), (b) transferring said first propylene copolymer fraction (Pre-PP1) in a second reactor, (c) polymerizing in said second reactor in the presence of the first propylene copolymer fraction (Pre-PP1) propylene and ethylene and/or $C_4$ to $C_{12}$ α-olefin obtaining a second propylene copolymer fraction (Pre-PP2), said first propylene copolymer fraction (Pre-PP1) and said second propylene copolymer fraction (Pre-PP2) form the matrix (Pre-PP), (d) transferring said matrix (Pre-M) in a third reactor, (e) polymerizing in said third reactor in the presence of the matrix (Pre-M) propylene and ethylene and/or $C_4$ to $C_{12}$ α-olefin obtaining an elastomeric propylene copolymer (Pre-E), said matrix (Pre-M) and said elastomeric propylene copolymer (Pre-E) form the heterophasic propylene copolymer (Pre-RAHECO)

(f) and visbreaking said heterophasic propylene copolymer (Pre-RAHECO) obtaining thereby the heterophasic propylene copolymer (RAHECO).

For preferred embodiments of the heterophasic propylene copolymer (Pre-RAHECO), the random propylene copolymer (Pre-R-PP), the first propylene copolymer fraction (Pre-PP1), the second propylene copolymer fraction (Pre-R-PP2), and the elastomeric copolymer (Pre-E) reference is made to the definitions given above.

Alternatively the heterophasic propylene copolymer (RAHECO) is directly produced in the multistage process as defined above and in more detail below without vis-breaking step (f). Accordingly the information provided for the multistage process is equally applicable for the manufacture of the heterophasic propylene copolymer (Pre-RAHECO) and the heterophasic propylene copolymer (RAHECO).

The term "sequential polymerization process" indicates that the heterophasic propylene copolymer (RAHECO) or (Pre-RAHECO) is produced in at least two, like three, reactors connected in series. Accordingly the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) or (Pre-RAHECO) as defined above the conditions for the first reactor, i.e. the slurry reactor, like a loop reactor, may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor is transferred to the second reactor, i.e. gas phase reactor, where the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor is similar to the second reactor.

The residence time can vary in the three reactor zones.

In one embodiment of the process for producing the heterophasic propylene copolymer (RAHECO) or (Pre-RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor, i.e. in the slurry reactor, like in the loop reactor, and/or as a condensed mode in the gas phase reactors.

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) or (Pre-RAHECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

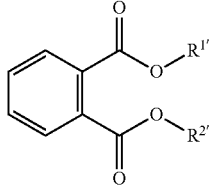

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

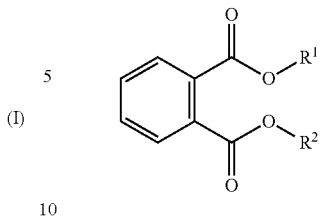

with $R^1$ and $R^2$ being methyl or ethyl, preferably ethyl, the dialkylphthalate of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (RAHECO) or (Pre-RAHECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \quad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof.

In a further embodiment, the Ziegler-Natta procatalyst can be modified by polymerizing a vinyl compound in the presence of the catalyst system, comprising the special Ziegler-Natta procatalyst (component (i)), an external donor (component (iii)) and optionally a cocatalyst (component (iii)), which vinyl compound has the formula:

$$CH_2=CH—CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

As already identified above, the heterophasic propylene copolymer (Pre-RAHECO) is subjected a visbreaking step (step (f)) obtaining thereby the heterophasic propylene copolymer (RAHECO). The visbreaking may be carried out in any known manner, but typically the present invention envisages chemical visbreaking using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Lupperox DC). Suitable amounts of peroxide to be employed in accordance with the present invention are in principle known to the skilled person and can easily be calculated on the basis of the amount of heterophasic propylene copolymer (Pre-RAHECO) to be subjected to visbreaking, the MFR$_2$ (230° C.) value of the heterophasic propylene copolymer (Pre-RAHECO) to be subjected to visbreaking and the desired target MFR$_2$ (230° C.) of the product, i.e. the heterophasic propylene copolymer (RAHECO), to be obtained. Accordingly, typical amounts of peroxide visbreaking agent are from 0.005 to 0.5 wt.-%, more preferably from 0.01 to 0.2 wt.-%, based on the amount of propylene polymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting in an overall decrease of the average molecular weight and an increase in melt flow rate.

The additives as stated above are added prior or after visbreaking to the heterophasic propylene copolymer (Pre-RAHECO) and the heterophasic propylene copolymer (RAHECO), respectively. Preferably, these additives are mixed into the heterophasic propylene copolymer (Pre-RAHECO) prior to visbreaking. In another preferred embodiment the additives and the degrading agent (peroxide) are added in the same extrusion/mixing process.

Filler (F)

The filler (F) according to this invention must be a glass material (GM). The glass material (GM) preferably can be glass beads or glass fibers (GF), the latter being preferred. The glass fibers (GF) may be either cut glass fibers or long glass fibers, although preference is given to using cut glass fibers, also known as short fibers or chopped strands. In general, the glass fibers can have a length of from 1 to 50 mm. The cut or short glass fibers used in the polyolefin composition preferably have a length of from 1.0 to 10.0 mm, more preferably from 3.0 to 7.0 mm, and/or a diameter of from 8 to 20 μm, more preferably from 10 to 15 μm.

Typically the glass fibers (GF) are surface treated with components like sizes, lubricants, or coupling agents Preferably the glass fibers (GF) according to this invention are treated with sizes, like organosilanes and/or water-soluble polymers. Such surface treatment is known to the skilled person. Reference in this regard is made for instance to the textbook "Plastic Additives" (Gächter/Müller; 3$^{rd}$ edition).

Compatibilizer (C)

To improve compatibility between the heterophasic propylene copolymer (RAHECO) and the glass material (GM) preferably a compatibilizer (C) is used.

The compatibilizer (C) preferably comprises, more preferably is, a modified (functionalized) polymer and optionally a low molecular weight compound having reactive polar groups. Modified α-olefin polymers, in particular propylene homopolymers and copolymers, like copolymers of ethylene and propylene with each other or with other α-olefins, are most preferred, as they are highly compatible with the polymers of the polyolefin composition. Modified polyethylene can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to using a propylene polymer grafted with maleic anhydride as the modified polymer, i.e. the compatibilizer (C).

The modified polymer, i.e. the compatibilizer (C), can be produced in a simple manner by reactive extrusion of the polymer, for example with maleic anhydride in the presence of free radical generators (like organic peroxides), as disclosed for instance in EP 0 572 028.

Preferred amounts of groups deriving from polar compounds in the modified polymer, i.e. the compatibilizer (C), are from 0.5 to 4% by weight.

Preferred values of the melt flow rate MFR$_2$ (230° C.) for the modified polymer, i.e. for the compatibilizer (C), are from 1.0 to 500 g/10 min.

Further Components

Additionally the polyolefin composition may comprise slip agent (SA) and/or carbon black (CB).

The slip agent (SA) is preferably a fatty acid amid. More preferably the slip agent is a saturated or unsaturated fatty acid amid, preferably an unsaturated fatty acid amid.

More preferably the unsaturated fatty acid amid is mono-unsaturated, i.e. contains only one ethylene group. Accordingly in one embodiment the unsaturated fatty acid amide is

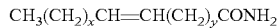

with x and y being independent from each other positive integers, more preferably $CH_3(CH_2)_xCH=CH(CH_2)_yCONH_2$ with x and y being independent from each other positive integers.

In one preferred embodiment the x is a positive integer between 4 and 10 and/or y is a positive integer between 8 and 14, preferably x=7 and y=11.

Thus it is especially preferred that the unsaturated fatty acid amide is $CH_3(CH_2)_7CH=CH(CH_2)_{11}CONH_2$, i.e. erucamide.

The instant polyolefin composition may additional contain typical other additives useful for in the automobile sector, like pigments other than carbon black, antioxidants, UV stabilizers, nucleating agents, and antistatic agents, in amounts usual in the art.

Articles and Use

The polyolefin composition of the present invention is preferably used for the production of molded articles in particular injection molded articles. Accordingly the present invention is in particular directed to the use of the instant polyolefin composition for molded automotive articles, preferably to automotive injection molded articles. Even more preferred is the use of the inventive composition for the production of car interiors and exteriors, like bumpers, side trims, step assists, body panels, spoilers, dashboards, interior trims and the like.

According to a preferred embodiment of the present invention, the polyolefin composition of the present invention is used for the production of (injection molded) automotive articles, preferably (injection molded) interior automotive articles, more preferably dash boards, instrument panels, door claddings, arm rests, gear sticks, shift lever knobs, mats, interior skins, trunk claddings, or interior trims.

The present invention also provides molded articles, like injection molded articles, comprising at least to 60 wt.-%, preferably at least 80 wt.-%, like 80 to 100 wt.-%, more preferably at least 95 wt.-%, like 95 to 100 wt.-%, and most preferably consisting of the inventive polyolefin composition. Accordingly the present invention is especially directed to (injection molded) automotive articles, especially to (injection molded) car interiors and exteriors, like bumpers, side trims, step assists, body panels, spoilers, dashboards, interior trims and the like, comprising at least to 60 wt.-%, preferably at least 80 wt.-%, like 80 to 100 wt.-%, more preferably at least 95 wt.-%, like 95 to 100 wt.-%, and most preferably consisting of, the inventive polyolefin composition.

According to a preferred embodiment of the present invention, the (injection molded) automotive article is an (injection molded) interior automotive article, more preferably a dash board, instrument panel, door cladding, arm rest, gear stick, shift lever knob, mat, interior skin, trunk cladding, or interior trim, comprising the polyolefin composition in amounts as stated in the previous paragraph.

The present invention will now be described in further detail by the examples provided below.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2) and (Pre-R-PP2), respectively:

$$\frac{C(PP) - w(PP1) \times C(PP1)}{w(PP2)} = C(PP2) \qquad (I)$$

wherein
w(PP1) is the weight fraction [in wt.-%] of the first propylene copolymer fraction (R-PP1) and (Pre-R-PP1), respectively,
w(PP2) is the weight fraction [in wt.-%] of second propylene copolymer fraction (R-PP2) and (Pre-R-PP2), respectively,
C(PP1) is the comonomer content [in wt.-%] of the first propylene copolymer fraction (R-PP1) and (Pre-R-PP1), respectively,
C(PP) is the comonomer content [in wt.-%] of the random propylene copolymer (R-PP) and (Pre-R-PP),
C(PP2) is the calculated comonomer content [in wt.-%] of the second propylene copolymer fraction (R-PP2) and (Pre-R-PP2), respectively.

Calculation of the xylene cold soluble (XCS) content of the second propylene copolymer fraction (R-PP2) and (Pre-R-PP2), respectively:

$$\frac{XS(PP) - w(PP1) \times XS(PP1)}{w(PP2)} = XS(PP2) \qquad (II)$$

wherein
w(PP1) is the weight fraction [in wt.-%] of the first propylene copolymer fraction (R-PP1) and (Pre-R-PP1), respectively,
w(PP2) is the weight fraction [in wt.-%] of second propylene copolymer fraction (R-PP2) and (Pre-R-PP2), respectively,
XS(PP1) is the xylene cold soluble (XCS) content [in wt.-%] of the first propylene copolymer fraction (R-PP1) and (Pre-R-PP1), respectively,
XS(PP) is the xylene cold soluble (XCS) content [in wt.-%] of the random propylene copolymer (R-PP) and (Pre-R-PP),
XS(PP2) is the calculated xylene cold soluble (XCS) content [in wt.-%] of the second propylene copolymer fraction (R-PP2) and (Pre-R-PP2), respectively.

Calculation of melt flow rate MFR$_2$ (230° C.) of the second propylene copolymer fraction (R-PP2) and (Pre-R-PP2), respectively:

$$MFR(PP2) = 10^{\left[\frac{\log(MFR(PP))-w(PP1)\times\log(MFR(PP1))}{w(PP2)}\right]} \quad \text{(III)}$$

wherein
w(PP1) is the weight fraction [in wt.-%] of the first propylene copolymer fraction (R-PP1) and (Pre-R-PP1), respectively,
w(PP2) is the weight fraction [in wt.-%] of second propylene copolymer fraction (R-PP2) and (Pre-R-PP2), respectively,
MFR(PP1) is the melt flow rate MFR$_2$ (230° C.) [in g/10 min] of the first propylene copolymer fraction (R-PP1) and (Pre-R-PP1), respectively,
MFR(PP) is the melt flow rate MFR$_2$ (230° C.) [in g/10 min] of the random propylene copolymer (R-PP) and (Pre-R-PP),
MFR(PP2) is the calculated melt flow rate MFR$_2$ (230° C.) [in g/10 min] of the second propylene copolymer fraction (R-PP2) and (Pre-R-PP2), respectively.

Calculation of comonomer content of the elastomeric propylene copolymer (E) and (Pre-E), respectively:

$$\frac{C(RAHECO) - w(PP) \times C(PP)}{w(E)} = C(E) \quad \text{(IV)}$$

wherein
w(PP) is the weight fraction [in wt.-%] of the random propylene copolymer (R-PP) and (Pre-R-PP),
w(E) is the weight fraction [in wt.-%] of the elastomeric propylene copolymer (E) and (Pre-E), respectively,
C(PP) is the comonomer content [in wt.-%] of the random propylene copolymer (R-PP) and (Pre-R-PP),
C(RAHECO) is the comonomer content [in wt.-%] of the heterophasic propylene copolymer (RAHECO)
C(E) is the calculated comonomer content [in wt.-%] of elastomeric propylene copolymer (E) and (Pre-E), respectively.

Calculation of xylene cold soluble (XCS) content of the third polypropylene (PP3):

$$\frac{XS(RAHECO) - w(PP) \times XS(PP)}{w(E)} = XS(E) \quad \text{(V)}$$

wherein
w(PP) is the weight fraction [in wt.-%] of the random propylene copolymer (R-PP) and (Pre-R-PP),
w(E) is the weight fraction [in wt.-%] of the elastomeric propylene copolymer (E) and (Pre-E), respectively,
XS(PP) is the xylene cold soluble (XCS) content [in wt.-%] of the random propylene copolymer (R-PP) and (Pre-R-PP),
XS(RAHECO) is the xylene cold soluble (XCS) content [in wt.-%] of the heterophasic propylene copolymer (RAHECO)
XS(E) is the calculated xylene cold soluble (XCS) content [in wt.-%] of elastomeric propylene copolymer (E) and (Pre-E), respectively.

Melting Temperature ($T_m$) and Crystallization Temperature ($T_c$): Measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature is determined from the cooling step, while melting temperature is determined from the second heating step Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997

The density is measured according to ISO 1183-1—method A (2004). Sample preparation is done by compression moulding in accordance with ISO 1872-2:2007.

The MFR$_2$ (230° C.) was measured according to ISO 1133 (230° C., 2.16 kg load).

The xylene cold solubles (XCS, wt.-%): Content of xylene cold solubles (XCS) was determined at 25° C. according ISO 16152; first edition; 2005-07-01

The intrinsic viscosity was measured according to DIN ISO 1628/1, October 1999 (in Decalin at 135° C.).

Tensile Modulus; Tensile stress at break were measured according to ISO 527-2 (cross head speed=1 mm/min; 23° C.) using injection molded specimens as described in EN ISO 1873-2 (dog bone shape, 4 mm thickness).

Charpy impact test: The Charpy notched impact strength (Charpy NIS) was measured according to ISO 179 1eA at 23° C., using injection molded bar test specimens of 80×10×4 mm$^3$ mm$^3$ prepared in accordance with ISO 294-1:1996

To determine the scratch resistance a Cross Hatch Cutter Model 420P, manufactured by Erichsen, was used. For the tests, plaques of 70×70×4 mm size were cut from a moulded grained (grain parameters: average grain size=1 mm, grain depth=0.12 mm, conicity=6°, also known as Grain VW K09) plaque of size 140×200×3 mm. The period between injection moulding of specimens and scratch-testing was 7 days.

For testing the specimens must be clamped in a suitable apparatus as described above. Scratches were applied at a force of 10 N using a cylindrical metal pen with a ball shaped end (radius=0.5 mm±0.01). A cutting speed of 1000 mm/min was used.

A minimum of 20 scratches parallel to each other were brought up at a load of 10 N with a distance of 2 mm. The application of the scratches was repeated perpendicular to each other, so that the result was a scratching screen. The scratching direction should be unidirectional. The scratch resistance is reported as the difference of the luminance ΔL of the unscratched from the scratched areas. ΔL values were measured using a spectrophotometer that fulfils the requirements to DIN 5033. Light source for quantification of ΔL D65/10°. Measured ΔL values must be below a maximum of 1.5.

A detailed test description of the test method (Erichsen cross hatch cutter method) can be found in the article "Evaluation of scratch resistance in multiphase PP blends" by Thomas Koch and Doris Machl, published in POLYMER TESTING 26 (2007), p. 927-936.

The gloss was measured on injection moulded grained specimen according to DIN 67530 at an angle of 60°. The grain for gloss measurements was identical to the grain used in evaluation of scratch resistance.

Sensotact Slippery: Most techniques for determining haptic properties of surfaces make use of haptic reference scales, a widespread example being the "Sensotact tactile reference frame" (Manufacturer: Cemas, Besançon, France). One of the parameters being determined in this method with the help of a sensory panel consisting of not less than 15 persons trained on the reference frame is the tangential slippery descriptor. It is defined as the subjective easiness of ensuring continuity in sliding along the surface. The protocol for measuring this parameter is defined as follows: Make a tangential movement of the index finger by miming the finger across the tested surface towards yourself at a low speed. The angle between the product and the finger has to be 45°. The easier the movement is, the higher the intensity of slippery is, the maximum being a value of 100. In the measurement, one has to be careful not to take into account the required force to start the movement. If possible, the slippery character in two perpendicular directions by a 90° rotation of the product should be evaluated. For selecting and evaluating the haptic panel DIN 10963, which is equivalent to ISO 8587 (2007), is followed.

2. Examples

RAHECO 1, RAHECO 2 and RAHECO 3

The catalyst used in the polymerization process for examples 1 and 2 was the commercial BCF20P catalyst (1.9 wt % Ti-Ziegler-Natta-catalyst as described in EP 591 224) of Borealis AG with triethyl-aluminium (TEA) as co-catalyst and dicyclo pentyl dimethoxy silane as donor. The aluminium to donor ratio is indicated in table 1.

The resulting polymers were visbroken in a co-rotating twin-screw extruder (type: Coperion ZSK 57) with suitable amounts of 2,5-dimethyl-2,5-di-(tert.butylperoxy)hexane (Trigonox® 101 supplied by AKZO Nobel, Netherlands). As additives 0.05 wt. % calcium stearate (Calcium stearate SP supplied by Faci, Italy) and 0.10 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl)phosphate)phosphite) of BASF AG, Germany were added to the polymers in the same step.

HECO 1 is the commercial heterophasic propylene copolymer SG930MO of Borealis AG P1 is the commercial styrene ethylene butylene styrene block copolymer product Kraton G 1657 of Kraton Polymers LLC having a styrene content of about 13.0 wt.-% and a melt flow rate MFR (230° C./5 kg) of 22 g/10 min P2 is the commercial ethylene-octene copolymer ENGAGE 8400 of Dow Elastomers with an $MFR_2$ (190° C.) of 30.0 g/10 min and a density of 0.87 g/cm$^3$ G is the commercial product Vetrotex EC13 P968 of Saint-Gobain Vetrotex International, Germany, which is a short-cut glass fiber with 13 μm fibre diameter and 6 mm length being surface coated C is the commercial maleic anhydride functionalized polypropylene Exxelor PO1020 of Exxon Mobil having a density 0.9 g/cm$^3$, an MFR (230° C./2.16 kg) of 430 g/10 min and an MAH content of 1.0 mol %

ESA is the commercial erucamide "Finawax-E" of Fine Organics

CB is the commercial carbon black masterbatch Plasblak PE4103 from Cabot with 30 wt.-% carbon black and an $MFR_2$ (190° C.) of 8 g/10 min.

TABLE 1

Process conditions

| | | RAHECO 1 | RAHECO 2 | RAHECO 3 |
|---|---|---|---|---|
| Al/donor ratio | [mol/mol] | 10 | 13.9 | 10 |
| Loop | | | | |
| H2/C3 ratio | [mol/kmol] | 0.98 | 1.46 | |
| C2/C3 ratio | [mol/kmol] | 4.4 | 8.9 | |
| $MFR_2$ | [g/10 min] | 1.25 | 1.3 | 8.0 |
| XCS | [wt.-%] | 4.1 | 8.2 | n.d. |
| C2 | [wt.-%] | 2.1 | 4.5 | 2.5 |
| GPR 1 | | | | |
| H2/C3 ratio | [mol/kmol] | 14.1 | 22 | |
| $MFR_2$ of GPR 1 | [g/10 min] | 1.5 | 2.1 | 8.0 |
| $MFR_2$ total | $MFR_2$ | 1.3 | 1.75 | 8.0 |
| XCS of GPR 1 | [wt.-%] | 41.4 | 45.4 | |
| XCS | [wt.-%] | 26.5 | 27.9 | |
| C2 of GPR 1 | [wt.-%] | 10.5 | 9.8 | 5.0 |
| C2 total | [wt.-%] | 7.1 | 7.3 | 4.0 |
| GPR 2 | | | | |
| C2/C3 ratio | [mol/kmol] | 467 | 439 | |
| H2/C2 ratio | [mol/kmol] | 250 | 250 | |
| $MFR_2$ of GPR 2 | [g/10 min] | 1.3 | 1.2 | 3.3 |
| $MFR_2$ | [g/10 min] | 1.3 | 1.6 | 7 |
| XCS of GPR 2 | [wt.-%] | 100 | 100 | n.d. |
| XCS | [wt.-%] | 41.7 | 42.1 | |
| C2 of XCS | [wt.-%] | 21.6 | 24.5 | |
| IV of XCS | [dl/g] | 1.9 | 1.6 | |
| C2 of GPR 2 | [wt.-%] | 32.1 | 35.4 | 30.7 |
| C2 content | [wt.-%] | 12.1 | 12.9 | 8.0 |
| Split Loop/ GPR 1/GPR 2 | [wt.-%] | 32/48/20 | 38/43/20 | 34/51/15 |

TABLE 2

Final Properties

| | | RAHECO 1* | RAHECO 2* | RAHECO 3 | HECO 1 |
|---|---|---|---|---|---|
| $MFR_2$ | [g/10 min] | 7.4 | 9.7 | 7.5 | 25 |
| Tm | [° C.] | 142 | 133 | 139 | 164 |
| Tc | [° C.] | 102 | 94 | 98.9 | 115 |
| C2 tot | [wt.-%] | 11.7 | 11.8 | 8.5 | 24 |
| XCS | [wt.-%] | 39.7 | 37.0 | 20.9 | 16 |
| IV of XCS | [dl/g] | 1.64 | 1.07 | 1.5 | 1.4 |
| C2 of XCS | [wt.-%] | 23.4 | 25.7 | 28.3 | 30 |

*visbroken

TABLE 3 (A)

Compositions (comparative)

| | | CE 1* | CE 2* | CE 3* | CE 4* | CE 5* | CE 6* |
|---|---|---|---|---|---|---|---|
| RAHECO 3 | [wt.-%] | 55.6 | 55.6 | 0 | 0 | 0 | 0 |
| HECO 1 | [wt.-%] | 0 | 0 | 35.6 | 45.6 | 35.6 | 45.6 |
| P1 | [wt.-%] | 20.0 | 0 | 40.0 | 30.0 | 0 | 0 |
| P2 | [wt.-%] | 0 | 20.0 | 0 | 0 | 40.0 | 30.0 |
| G | [wt.-%] | 20.0 | 20.0 | 20.0 | 20.0 | 20.0 | 20.0 |
| C | [wt.-%] | 1.0 | 1.0 | 1.0 | 1.0 | 1.0 | 1.0 |

TABLE 3 (A)-continued

| | | Compositions (comparative) | | | | | |
|---|---|---|---|---|---|---|---|
| | | CE 1* | CE 2* | CE 3* | CE 4* | CE 5* | CE 6* |
| CB | [wt.-%] | 3.0 | 3.0 | 3.0 | 3.0 | .3.0 | 3.0 |
| ESA | [wt.-%] | 0.3 | 0.3 | 0.3 | 0.3 | 0.3 | 0.3 |

*the remaining part to 100 wt.-% are antioxidants

TABLE 3 (B)

| | | Properties of the compositions (comparative) | | | | | |
|---|---|---|---|---|---|---|---|
| | | CE 1 | CE 2 | CE 3 | CE 4 | CE 5 | CE 6 |
| $MFR_2$ | [g/10 min] | 4.6 | 6.4 | 7.8 | 8.7 | 16.5 | 13.9 |
| D | [kg/m³] | 1014 | 1008 | 1034 | 1036 | 1030 | 1020 |
| TM | [MPa] | 1137 | 1231 | 625 | 1502 | 1048 | 1424 |
| TS | [MPa] | 5.2 | 5.7 | 15.2 | 22.8 | 7.5 | 11.2 |
| C (+23) | [kJ/m²] | 41.2 | 40.2 | 47.3 | 43.6 | 29.1 | 29.9 |
| SR | [\|ΔL\|] | 0.2 | 0.3 | 0.7 | 0.5 | 1.0 | 0.8 |
| G | [%] | 2.5 | 2.4 | 2.8 | 2.6 | 2.5 | 2.5 |
| SS | [—] | 85 | 90 | 65 | 70 | 65 | 70 |

D Density
TM Tensile modulus
TS Tensile stress at break
C (+23) Charpy impact at +23° C.
C (−20) Charpy impact at −20° C.
SR Scratch resistance
G Gloss
SS Sensotact Slippery

TABLE 4 (A)

| | | Compositions (inventive) | |
|---|---|---|---|
| | | E1 | E2 |
| RAHECO 1 | [wt.-%] | 75.6 | 0 |
| RAHECO 2 | [wt.-%] | 0 | 75.6 |
| G | [wt.-%] | 20.0 | 20.0 |
| C | [wt.-%] | 1.0 | 1.0 |
| CB | [wt.-%] | 3.0 | 3.0 |
| ESA | [wt.-%] | 0.3 | 0.3 |

* the remaining part to 100 wt.-% are antioxidants

TABLE 4 (B)

| | | Properties of the compositions (inventive) | |
|---|---|---|---|
| | | E1 | E2 |
| $MFR_2$ | [g/10 min] | 4.5 | 3.9 |
| D | [kg/m³] | 1028 | 1029 |
| TM | [MPa] | 1767 | 1905 |
| TS | [MPa] | 27.6 | 30.9 |
| C (+23) | [kJ/m²] | 31.8 | 31.6 |
| SR | [\|ΔL\|] | 0.2 | 0.1 |
| G | [%] | 2.2 | 2.2 |
| SS | [—] | 85 | 85 |

The invention claimed is:

1. Polyolefin composition comprising:
(a) at least 50 wt. % based on the polyolefin composition of a heterophasic propylene copolymer (RAHECO) comprising a matrix (M) being a random propylene copolymer (R-PP) and an elastomeric propylene copolymer (E) dispersed in said matrix (M),
wherein said heterophasic propylene copolymer (RAHECO) has
(a1) a xylene cold soluble fraction (XCS) determined according ISO 16152 (25° C.) in the range of 25 to 50 wt. % based on the heterophasic propylene copolymer (RAHECO), and
(a2) a comonomer content in the range of 10.0 to 15.0 wt. % based on the heterophasic propylene copolymer (RAHECO),
wherein further the xylene cold soluble fraction (XCS) of the heterophasic propylene copolymer (RAHECO) has
(a3) a comonomer content in the range of 20 to 30 wt. % based on the xylene cold soluble fraction (XCS) of the heterophasic propylene copolymer (RAHECO) and
(a4) an intrinsic viscosity (IV) determined according to DIN ISO 1628/1 (in Decalin at 135° C.) in the range of 0.8 to below 2.0 dl/g,
(b) at least 5 wt.-% based on the polyolefin composition of a filler (F) being a glass material (GM), and
(c) a compatibilizer (C),
wherein the polyolefin composition has a melt flow rate $MFR_2$ (230° C.) measured according to ISO 1133 of 2.0 to 15.0 g/10 min.

2. Polyolefin composition according to claim 1, wherein the polyolefin composition has:
(a) a density measured according to ISO 1183-1 of not more than 1100 kg/m³, and/or
(b) tensile modulus measured according to ISO 527-2 of at least 1,000 MPa, and/or
(c) a gloss at an angle of 60° of below 2.5%.

3. Polyolefin composition according to claim 1, wherein the polyolefin composition does not comprise:
(a) a further plastomer, and/or
(b) a polymer different to the heterophasic propylene copolymer (RAHECO) in an amount exceeding 4 wt. % based on the polymers present in the polyolefin composition.

4. Polyolefin composition according to claim 1, wherein the heterophasic propylene copolymer (RAHECO) has:
  (a) a melt flow rate $MFR_2$ (230° C.) measured according to ISO 1133 in the range of 2.0 to 15.0 g/10 min, and/or
  (b) a melting temperature Tm determined by differential scanning calorimetry (DSC) in the range of 130 to 150° C.

5. Polyolefin composition according to claim 1, wherein the random propylene copolymer (R-PP) comprises at least two propylene copolymer fractions (R-PP1) and (R-PP2), wherein the first propylene copolymer faction (R-PP1) has a comonomer content in the range of 2.0 to 6.0 wt. %, wherein optionally further
  (a) the second propylene copolymer fraction (R-PP2) has a higher comonomer content than the first propylene copolymer faction (R-PP1), and/or
  (b) [R-PP]−[R-PP1]≥2.5
  wherein
  [R-PP] the comonomer content [wt. %] of the random propylene copolymer (R-PP), and
  [R-PP1] the comonomer content [wt. %] of the first propylene copolymer fraction (R-PP1), and/or
  (c) the second propylene copolymer fraction (R-PP2) has a comonomer content in the range of 8.0 to 12.0 wt. %.

6. Polyolefin composition according to claim 1, wherein the comonomers of the random propylene copolymer (R-PP), the first propylene copolymer fraction (R-PP1) and the second propylene copolymer fraction (R-PP2) are ethylene and/or $C_4$ to $C_{12}$ α-olefin.

7. Polyolefin composition according to claim 1, wherein the glass material (GM) are glass fibers (GF).

8. Polyolefin composition according to claim 1, wherein the polyolefin composition comprises the compatibilizer (C) in an amount of 0.5 to 4 wt. % based on the polyolefin composition.

9. Polyolefin composition according to claim 1, wherein the compatibilizer (C) is a maleic anhydride functionalized polypropylene.

10. Polyolefin composition according to claim 1, wherein the polyolefin composition additionally comprises a slip agent (SA) in an amount of 0.01 to 2 wt. % based on the polyolefin composition.

11. Polyolefin composition according to claim 10, wherein the slip agent (SA) is a fatty acid amid.

12. Polyolefin composition according to claim 1, wherein the polyolefin composition additionally comprises carbon black (CB) in an amount of 0.5 to 5 wt. % based on the polyolefin composition.

13. Injection molded article comprising a polyolefin composition according to claim 1.

14. Injection molded article according to claim 13, wherein the article is a car interior article.

15. Process for the manufacture of a polyolefin composition according to claim 1, wherein:
  (a) the heterophasic propylene copolymer (RAHECO),
  (b) the filler (F)
  (c) the compatibilizer (C),
  (d) optionally the slip agent (SA), and
  (e) optionally the carbon black (CB)
  are added to an extruder and extruded obtaining thereby the polyolefin composition.

* * * * *